Feb. 4, 1964  J. W. ROGERS  3,120,232
PEA AND BEAN SLITTING DEVICES
Filed Oct. 24, 1960
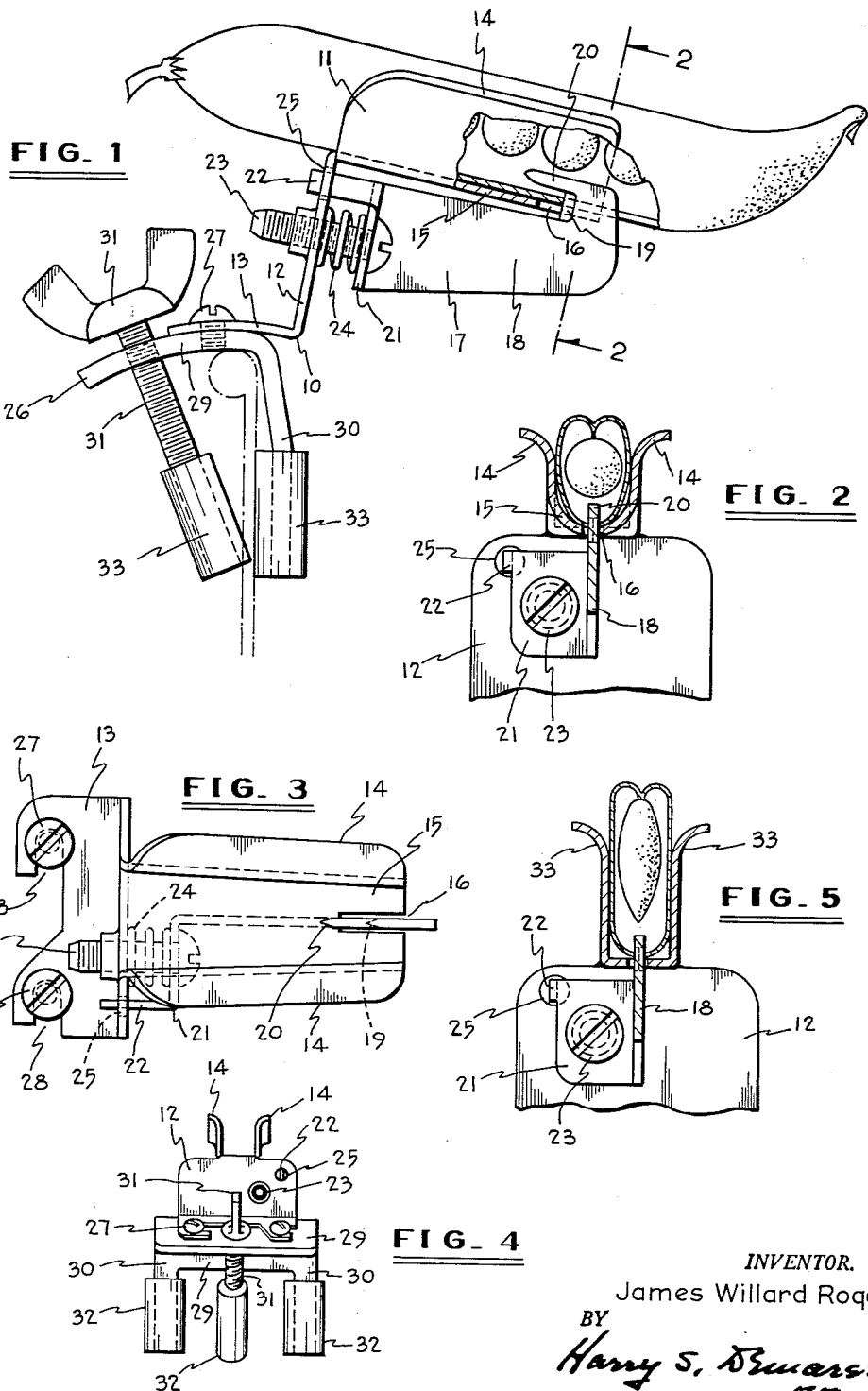
INVENTOR.
James Willard Rogers 3,120,232
PEA AND BEAN SLITTING DEVICES
James Willard Rogers, 411 E. Lee St., Thomaston, Ga.
Filed Oct. 24, 1960, Ser. No. 64,627
1 Claim. (Cl. 130—39)

This invention relates to the slitting of dehiscent vegetables more particularly legumes such as peas and beans so as to allow easy and efficient removal of the edible portions thereof.

An object of this invention is to provide a simple and efficient instrument to slit a pea or bean pod without mutilating the pea or bean in the pod.

A further object of this invention is to provide a device for slitting pea or bean pods so constructed that the slitting knife is automatically guided with respect to the pod so as to limit the cutting action to the dorsal suture of the pod.

A further object of this invention is to provide a pea and bean pod slitter with an adjustable slitting blade so constructed that the operator cannot accidentally injure his fingers while operating the device.

Other and further object of this invention reside in a simplified construction of a pea and bean pod slitter as set forth more fully in the specification hereinafter following by reference to the accompanying drawings in which, FIGURE 1 is a side elevation of a preferred embodiment of the pea and bean slitter with parts broken away, FIGURE 2 is a cross-section taken on line 2—2 of FIGURE 1, FIGURE 3 is a top plan view of the slitter, FIGURE 4 is a rear view of the improved device, and FIGURE 5 is a cross-section similar to FIGURE 2 but showing a modified form of trough.

Referring now to the drawings wherein similar reference characters refer to similar parts, the improved pea and bean slitter comprises a main member 10 which is formed in three principal parts, namely a trough portion 11, a knife supporting portion 12 and a mounting portion 13. The trough portion 11 is formed with flaring side walls 14—14 and with a bottom 15 which cooperate to guide a pea or bean pod manipulated by the operator throughout its length. The bottom 15 is formed with a slot 16 at its outboard end. The main member 10 is so formed and constructed that the angle included between the trough bottom 15 and the knife supporting portion 12 is slightly less than a right angle, for example but without limitation 85 to 87 degrees, all for purposes which will hereinafter be disclosed.

Resiliently and adjustably mounted on the knife supporting portion 12 is a hook shaped knife 17 which comprises a shank portion 18, a cutting edge 19 and an elongated barb 20 immediately adjacent said cutting edge having a blunt top surface. The rear end of the knife 17 is formed with a perforated right angle wing 21 having a rearwardly extending lug or ear 22. A screw headed bolt and nut 23 secures the knife 17 perpendicularly to the support 12 and a helical spring 24 surrounds the bolt 23 between the wing 21 and the support 12. The lug or ear 22 engages an aperture 25 in the support 12 to prevent any rotary motion of the knife 17 with respect to the support 12 or to the trough 11. When the knife 17 is secured to the support 12, the cutting edge 19 and the barb 20 project through the slot 16 into the trough portion 11 with the end of the barb extending slightly beyond the end of the slot.

For ease and efficiency in use, the above described assembly is secured to a clamp 26 by any suitable means for example screws 27 which engage slots 28 on the mounting portion 13 and tapped holes in the saddle 29 of the clamp. Two fixed legs 30—30 depend from saddle 28 and a movable leg in the form of a wing headed bolt 31 screw threadedly engages the saddle 29 of the clamp 25. Each leg of the clamp carries near its extremity a rubber sleeve 32 which affords a firm grip on and prevents marring of the side wall of a pan on which the clamp 26 is mounted.

It is contemplated that the operator will be furnished with several trough members so that one can be selected that will best fit the shape of the pod to be slit. FIGURE 5 for example shows in cross-section a deep narrow trough the side walls 33 particularly adapted to guide lima and butter bean pods. It will be noted that the side walls 14 and the side wall 33 are further apart at the rear end of the trough than at the front end. This construction allows the operator to place the pod in the trough with ease and then it is guided accurately over the knife 17 when moved by the operator.

In operation the device is usually clamped to the side wall of a pan or other suitable container. Peas and beans are appended to the ventral suture of a pod so therefore the operator grasps with one hand a pod with the dorsal suture facing downwardly. The pod is placed in the rear end of the trough and subjected to gentle downward pressure from the other hand of the operator. The pod is then moved longitudinally through the trough 11 until the pod contacts the elongated barb 20 and is pierced thereby. Once the pod is pierced, the barb 20 enters the pod and then acts as a guide to maintain proper registration of the dorsal suture relative to the cutting edge 19 of the knife.

As the knife 17 is resiliently mounted on the support 12, the barb and the cutting edge are capable of a small but limited vertical movement. This construction automatically allows the barb and the cutting edge to adjust to various thicknesses of pod shell encountered by the operator. Since the knife 17 is mounted at a slight angle to the bottom of the trough 11, a relative longitudinal movement of these two elements caused by screwing or unscrewing the bolt 23 effects a micrometric adjustment of the barb and cutting edge relative to bottom of the trough 11.

To complete the slitting operation, the pod is pulled through the trough by the operator. The pod can then be spread apart and the peas or beans readily dislodged.

As many changes could be made in the above method and construction, and many apparently widely different embodiments of this invention could be made without departing from the scope thereof, it is intended that all matters contained in the above description or shown in the accompanying drawings shall be interpreted as illustrative and not in a limiting sense.

What I claim as new and desire to secure by Letters Patent is:

A slitting device for legume pods comprising a clamp adapted to seat on the side wall of a pan and to support a main member forming a trough having a slot in its bottom wall, a knife support and a base detachably connected to said clamp, a hook shaped knife, means to resiliently and adjustably secure said knife to said knife support, said knife extending along the exterior of the bottom of said trough at a slight angle thereto and provided with a cutting edge and an immediately adjacent elongated barb which project through the slot in the bottom of said trough.

References Cited in the file of this patent

UNITED STATES PATENTS

| | | |
|---|---|---|
| 2,212,637 | Flanagan | Aug. 27, 1940 |
| 2,277,777 | Ponto | Mar. 31, 1942 |
| 2,446,749 | Evernden | Aug. 10, 1948 |
| 2,621,659 | Greene | Dec. 16, 1952 |